Sept. 25, 1934.   E. REID   1,974,509
BRAKE
Filed March 18, 1931

Inventor
Earl Reid

Patented Sept. 25, 1934

1,974,509

UNITED STATES PATENT OFFICE 1,974,509

BRAKE

Earl Reid, Chicago, Ill.

Application March 18, 1931, Serial No. 523,399

18 Claims. (Cl. 188—78)

This invention relates to brakes and more particularly to brakes of the internal expanding type.

An object of the invention is to provide a brake of the internal expanding type in which the outward radial pressures exerted by expanding the band or shoes are substantially uniform at any point around the entire circumference of the drum.

Another object of the invention is to provide an internal expanding brake so designed as to get full energizing effect and to limit high unit pressures.

Another object of the invention is to provide an internal expanding brake structure in which a split spring steel band is utilized as the expanding element and is expanded by applying pressure to one end, while the other end is restrained from circumferential motion.

A further object of the invention is to provide an internal expanding brake which is so arranged that one end of the expanding element will travel outwardly in correct proportion to circumferential travel and outward radial movement of the other end when applied.

A further object of the invention is to provide an internal expanding brake which is highly efficient in operation and yet of marked simplicity as a whole and with respect to each of its component parts so that its manufacture is economically facilitated, both as regards parts and their assembly.

Other objects of the invention will appear from the following description taken in connection with the drawing, which forms a part of this specification, and in which.

Figure 1:
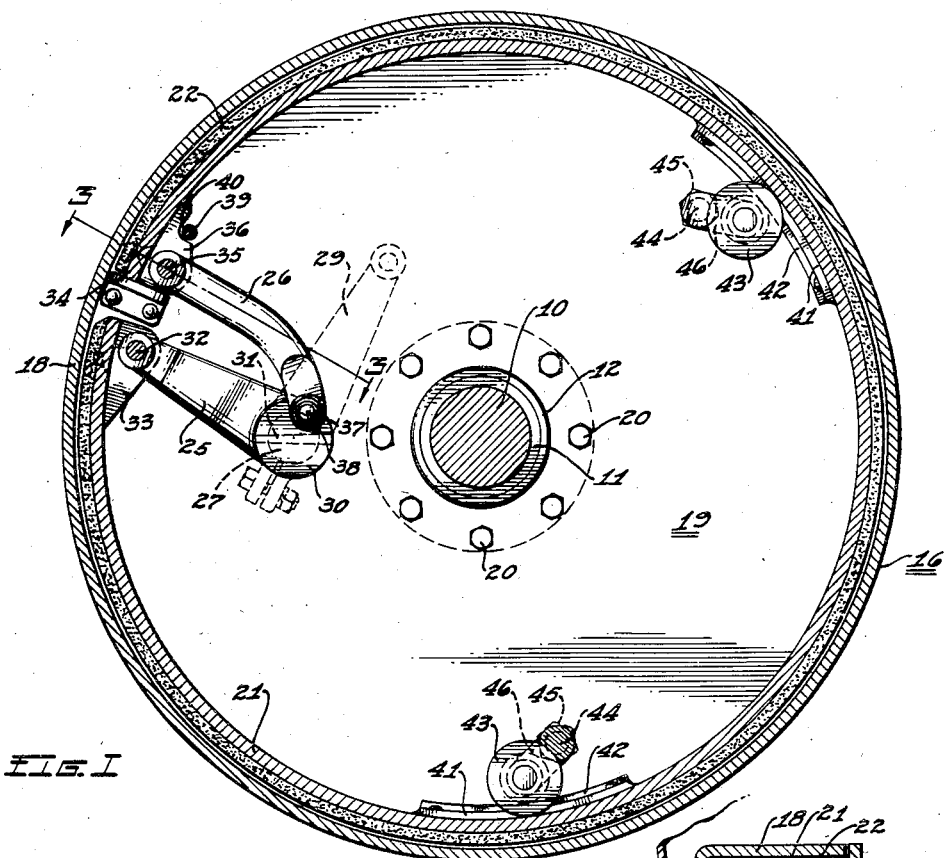
Fig. 1 is a longitudinal sectional view of a brake illustrating my invention and showing the expanding element in the free or inactive position.
Figure 2:
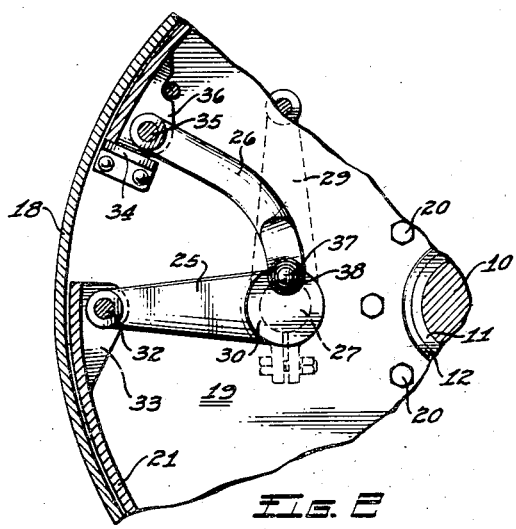
Fig. 2 is a fragmentary sectional view similar to Fig. 1, showing the position of the operating mechanism and the expanding element when the element is fully expanded and the friction material has been entirely worn from the same.
Figure 3:
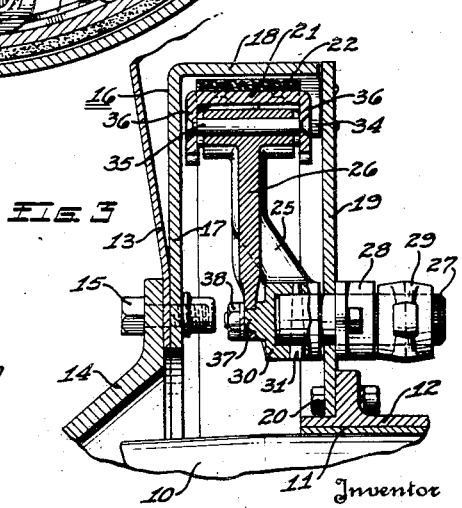
Fig. 3 is a sectional view taken substantially on the line 3—3 of Fig. 1.

Referring to the drawing by characters of reference, 10 represents an axle shaft of an automobile, which is mounted to rotate in a bearing 11, supported by a stationary axle hosing 12. A wheel 13 having a hub 14 is adapted to rotate about the shaft 10 and has secured thereto, by means of bolts 15, a drum 16 consisting of a face plate 17 and an integral cylindrical flange 18. A backing plate 19 is secured to the axle housing by bolts 20.

An expandable member 21, preferably a cylindrical spring steel band formed in one piece and having friction material 22 secured thereto, is positioned within the drum adjacent the cylindrical flange 18 and is retained midway between the face plate 17 and the backing plate 19 by means of rollers 43, guides 41, the actuating lever 25 and the link 26, the further purpose of which will hereinafter appear.

A shaft 27 is rotatably mounted in a bearing 28 which is secured by means of bolts to the backing plate 19, one end of the shaft extending through an aperture in the backing plate into the interior of the drum. The other end of the shaft extends outwardly of the bearing 28 and is serrated to receive a control lever 29 which may be connected to any suitable linkage such as a rod or cable (not shown) for the purpose of actuating the brake.

The hub 30 of the actuating lever 25 is secured to the shaft 27 by means of a pin 31, the opposite end being pivotally secured as at 32 to parallel flanges 33 which are integral with and located at one end of the band 21. A stop member 34 is riveted or otherwise secured to the backing plate 19 for the purpose of preventing circumferential motion of the other end of the band.

It will readily be seen that rotation of the shaft 27 will rotate the lever 25 which will move one end of the band 21 circumferentially thereby increasing its radius, causing the friction material 22 secured thereto to exert outward radial pressures against the periphery of the drum flange 18 and so stop the drum from rotating.

It will also be seen that a self-energizing or wrapping effect caused by the contact of the rotating drum and the friction material will add considerably to the braking power, therefore making only a minimum of manual effort on the part of the operator necessary when applying the brakes.

In a brake constructed according to this invention so far set forth, extreme outward radial pressure would be exerted by the band 21 at and adjacent the end which is prevented from circumferential motion, due to more rapid outward radial motion of this end of the band.

To prevent this extreme pressure at one end of the band I provide a link 26, one end of which is pivotally secured as at 35 to parallel flanges 36 similar to the flanges 33 and located on the end of the band which is prevented from circumferential motion by the stop member 34. The opposite end of the link 26 is pivotally secured to an extension 37 on the hub 30 of the actuating lever 25 and is prevented from axial movement by a nut 38. The extension 37 is eccentrically located relative to the center of the hub 30, at a predetermined distance from the same and at the proper angle relative to the center of the actuating lever 25.

Counter-clockwise rotation of the control lever 29, the shaft 27 and the actuating lever 25 will cause the band 21 to be expanded outward radially toward the drum flange 18. The degree of rotation of the lever 25 determines the amount of outward radial movement of the major portion of the band, the remaining portion of the band being moved outward radially a greater distance due to the stop member 34 preventing circumferential motion of the same; but the link 26 is located and pivoted to the hub 30 of the lever 25 in such manner that the extension 37 to which the link is pivoted will move in an arc a distance which would be approximately equal to the outward radial movement of the said major portion of the band, thereby allowing the remaining portion of the band to move outward radially only a distance as great as the major portion, the outward radial movement of the band being therefore equal throughout its circumference.

A pin 39 is secured to the backing plate 19 and is adapted to engage a slot 40 in the flanges 36 to prevent any tendency of the band to be moved circumferentially by its contact with the clockwise revolving drum when reversing, and therefore interfere with normal operation of the brake.

The guide members 41, previously mentioned, are centrally disposed laterally of the band 21 and are secured thereto in any convenient manner. Flanges 42 extend perpendicularly to the base of the guides and engage slots in the bifurcated rollers 43.

Shafts 44 extend perpendicularly to and through the backing plate 19 and are secured in any degree of rotative adjustment by a nut 45. These shafts have integral arms 46 extending radially therefrom and on the end of the arms are mounted bifurcated rollers 43 which are adapted to engage the flanges 42 and bear against the guides. The rollers are centrally located midway between the backing plate 19 and the drum face 17. Therefore, due to the engagement of the rollers with the flanges 42, the band 21 will be retained midway between the backing plate and the drum face.

It will be seen that rotation of the shafts 44 will determine the position of the rollers 43 relative to the guides 41, thereby providing an adjustable means for increasing or decreasing the clearance between the friction material and the inner periphery of the drum flange 18.

Although the invention has been described in connection with a specific embodiment, the principles involved are susceptible of numerous other applications which will readily occur to persons skilled in the art. The invention is therefore to be limited only as indicated by the scope of the appended claims.

What I claim and desire to secure by Letters Patent is:

1. In a brake mechanism of the internal expanding type, a flanged drum, an expandable element within the drum, means for expanding said element radially toward the drum flange and means eccentrically associated with said expanding means, for maintaining the outward radial movement of the expandable element uniform throughout its length, during its entire range of movement.

2. In a brake mechanism, a flanged drum, an expandable element within the drum, means for expanding said element radially toward the drum flange, and separate means connecting the expandable element to the expanding means for maintaining the outward radial movement of the expandable element uniform throughout its length, during its entire range of movement.

3. In a brake mechanism of the internal expanding type, a flanged drum, an expandable element with the drum, pivoted means associated with one end only of the expandable element for expanding said element radially toward the drum flange and means eccentrically associated with said pivoted expansion means, for maintaining the outward radial movement of the expandable element uniform throughout its length, during its entire range of movement.

4. In a brake mechanism of the internal expanding type, a flanged drum, an expandable element within the drum, pivoted lever means for expanding said element radially toward the drum flange and link means eccentrically associated with said pivoted lever means, for maintaining the outward radial movement of the expanding element uniform throughout its length, during its entire range of movement.

5. In a brake mechanism of the internal expanding type, a flanged drum, an expandable element within the drum, pivoted means for expanding said element radially toward the drum flange and means secured to said pivoted expansion means in offset relation to the pivot thereof, for maintaining the outward radial movement of the expanding element uniform throughout its length.

6. In a brake mechanism of the internal expanding type, a flanged drum, an expandable element within the drum, means including a pivoted lever pivoted to one end of the expandable element for expanding said element radially toward the drum flange, and means eccentrically pivoted to said lever and associated with the other end of the expanding element for maintaining the outward radial movement of the expanding element uniform throughout its length.

7. In a brake mechanism of the internal expanding type, a flanged drum, an expandable band within the drum, means associated with one end of the band for expanding the same radially toward the drum flange, means associated with the opposite end of the band for preventing circumferential motion thereof, and separate means connecting the band with said expanding means for maintaining the outward radial movement of the band uniform throughout its length, during its entire range of movement.

8. In a brake mechanism of the internal expanding type, a flanged drum, a one-piece expandable band within the drum, means including a lever pivoted to one end of the band and to a backing plate for expanding the band radially toward the drum flange, a stop member associated with the opposite end of the band for preventing circumferential movement thereof, means including a link member pivoted at one end to the band and at the other end to the lever in offset relation to the pivot thereof, for maintaining the outward radial movement of the band uniform throughout its length during its entire range of movement, and means including adjustable rollers for limiting the amount of clearance between the friction material and the drum flange, also to centrally locate the band relative to the face of the drum and the backing plate.

9. In a brake mechanism of the internal expanding type, a flanged drum, a split one-piece, expandable band having friction material and guide members secured thereto within the drum, means including a lever pivoted to a backing plate and associated with one end of the band for moving said end circumferentially and radially outward toward the drum flange, a stop member secured to the backing plate for preventing circumferential movement of the opposite end of the band, means including a link member pivoted at one end to the band and at the other end to the lever, in eccentric relation therewith for maintaining the outward radial movement of the band uniform throughout its length, and means including rollers associated with guide members for centrally locating the band relative to the face of the drum and the backing plate, and to limit the clearance between the friction material and the drum flange.

10. In a brake mechanism of the internal expanding type, a brake drum, an expandable element within said drum, means associated with one end of said element, for preventing circumferential movement of that end, means associated with the other end of the expandable element for expanding said element radially toward the drum flange, and tension means connecting the expandable element and the expanding means for maintaining the outward radial movement of said element uniform throughout its length, during its entire range of movement.

11. In a brake mechanism of the internal expanding type, a brake drum, an expandable element within said drum, means associated with one end of said expandable element for preventing circumferential movement of that end, expansion means associated with the opposite end of the expandable element, and link means connecting the expandable element and the expansion means for maintaining the outward radial movement of said element uniform throughout its length, during its entire range of movement.

12. In a brake mechanism of the internal expanding type, a brake drum, a non-continuous expandable element within said drum, means associated with one end of said element for preventing circumferential movement of that end, expansion means associated with the opposite end of said element, and means associated with the expansion means and the expandable element adapted to prevent that portion of the expandable element with which said means is associated from exerting high unit pressures on the drum.

13. In a brake mechanism of the internal expanding type, a brake drum, a non-continuous expandable element within said drum, means associated with one end of said element adapted to prevent circumferential movement of that end in one direction and to limit circumferential movement of said end in the opposite direction, means associated with the opposite end of said element for moving said end circumferentially, thereby expanding said element radially into contact with the drum, and means associated with said expanding means and the first mentioned end of the expandable element, for maintaining substantially equal pressure per unit area of contact of said expandable element with said drum when in expanded relation therewith.

14. In a brake mechanism of the internal expanding type, a brake drum, an expandable element within said drum, means for expanding said element radially into frictional engagement with the drum, and means connecting the expandable element and the expansion means for maintaining the outward radial movement of the expandable element uniform throughout its length, during its entire range of movement.

15. In a brake mechanism of the internal expanding type, a brake drum, an expandable element within said drum, means for expanding said element radially into frictional engagement with the drum, and link means connecting the expandable element and the expansion means for maintaining the outward radial movement of the expandable element uniform throughout its length, during its entire range of movement.

16. In a brake mechanism of the internal expanding type, a brake drum, an expandable element adapted to be expanded into frictional engagement with said drum, means for expanding said element, and means associated with the expandable element and the expansion means arranged to retard the outward radial movement of that portion of the expandable element with which said means is associated.

17. In a brake mechanism of the internal expanding type, a brake drum, an expandable element within said drum, pivoted levers pivotally associated with the expandable element and with each other, one of said levers arranged to expand said element into frictional relation with the drum, while the other of said levers is arranged to control the outward radial movement of that portion of the expandable element with which it is associated.

18. In a brake mechanism of the internal expanding type, a brake drum, an expandable element within said drum, means associated with one end of the expandable element for expanding said element radially toward the drum, and retarding means associated with the other end of the expandable element arranged to compensate for the energizing effect of the drum on that portion of the element with which said means is associated.

EARL REID.